(12) United States Patent
Duret et al.

(10) Patent No.: US 7,650,802 B2
(45) Date of Patent: *Jan. 26, 2010

(54) DEFORMATION-SENSING BEARING HAVING FOUR STRAIN GAUGES

(75) Inventors: Christophe Duret, Annecy (FR); Olivier Blanchin, Annecy (FR)

(73) Assignee: S.N.R. Roulements, Annecy (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/579,112

(22) PCT Filed: May 3, 2005

(86) PCT No.: PCT/FR2005/001108

§ 371 (c)(1), (2), (4) Date: Sep. 12, 2007

(87) PCT Pub. No.: WO2005/121733

PCT Pub. Date: Dec. 22, 2005

(65) Prior Publication Data

US 2008/0095483 A1    Apr. 24, 2008

(30) Foreign Application Priority Data

May 4, 2004    (FR) .................................. 04 04768

(51) Int. Cl.
*G01L 3/02* (2006.01)

(52) U.S. Cl. .................................... 73/862.322; 73/760

(58) Field of Classification Search ................................. 73/862.331–862.333, 862.08–862.69
See application file for complete search history.

(56) References Cited

U.S. PATENT DOCUMENTS

| 4,203,319 | A |   | 5/1980 | Lechler |
|---|---|---|---|---|
| 4,705,969 | A |   | 11/1987 | Gross |
| 5,140,849 | A | * | 8/1992 | Fujita et al. .................. 73/593 |
| 6,490,935 | B1 | * | 12/2002 | Joki et al. ................ 73/862.49 |
| 6,658,943 | B2 | * | 12/2003 | McDearmon ................ 73/795 |
| 2002/0062694 | A1 |   | 5/2002 | Ehrfeld et al. |
| 2002/0194927 | A1 |   | 12/2002 | Yoshida et al. |
| 2003/0145651 | A1 |   | 8/2003 | Hofmann et al. |
| 2009/0044633 | A1 | * | 2/2009 | Duret et al. .................. 73/795 |

FOREIGN PATENT DOCUMENTS

DE    100 41 093 A1    3/2002
EP    1 221 589 A2    7/2002

* cited by examiner

*Primary Examiner*—Max Noori
(74) *Attorney, Agent, or Firm*—Arent Fox LLP

(57) ABSTRACT

A bearing which includes at least one system for determining an amplitude of pseudo-sinusoidal deformations induced during rotation of a fixed ring within a zone, wherein the system includes four strain gauges spaced equally apart from each other within the zone, a device for measuring four signals based on time variations of a signal emitted by each gauge and for forming two signals for the same angle and amplitude, and a device for computing the time-dependent amplitude A of the zone deformations for calculating an expression such that the amplitude is derived therefrom.

19 Claims, 4 Drawing Sheets

DEFORMATION-SENSING BEARING HAVING FOUR STRAIN GAUGES

The invention relates to a bearing comprising a fixed or "stationary" ring, a rotary ring, and at least one row of rolling bodies disposed in a raceway that is formed between said rings so as to enable them to rotate relative to each other.

It applies typically to motor vehicle wheel bearings, the stationary ring being secured to the chassis of said vehicle and the wheel being associated with rotary ring.

When it is desired to determine the forces that are applied at the interface between the wheel and the surface on which the wheel is rotating, it is known that it is possible to measure said forces at the tire or at the chassis. Unfortunately, measurement at the tire poses major problems as regards transmitting the signal between the rotary reference frame of the tire and a stationary computation reference frame, it also being necessary for said rotary reference frame to be positioned continuously relative to said stationary reference frame so as to be able to perform the computations. As for measurement at the chassis, it is made difficult by the distribution of the forces between the various members that connect the wheel to said chassis.

Therefore, as proposed in Documents FR-2 839 553 and FR-2 812 356, the stationary ring, which is the first connection member between the wheel and the chassis, is used in particular as a support for determining the forces that are exerted at the interface between the wheel and the surface while the vehicle is moving.

In particular, such forces can be determined by measuring deformations in the stationary ring that are induced by the rolling bodies going past. The amplitude of such deformations is representative of the forces to be determined.

One of the problems that arises with such a force determination strategy is that the deformation signal depends on the speed of rotation. In particular, the quality of measurement at low speed is insufficient and forces can be determined only after measurement of deformations induced by at least two successive passes of rolling bodies.

Therefore, that problem is even more critical when force measurement must be performed in real time or with a delay that is a short as possible, as is necessary for systems for controlling the dynamics of the vehicle, such as, for example, an Antilock Braking System (ABS) or an Electronic Stability Program (ESP).

A particular object of the invention is to remedy this problem by proposing a bearing provided with a system for determining the amplitude of the deformations in the stationary ring, said system being arranged to perform spatial interpolation on the deformation signal so as to have, at any instant and independently of the speed of rotation, a measurement of the deformations and thus be able to determine the forces.

To this end, the invention provides a bearing comprising a stationary ring, a rotary ring, and at least one row of rolling bodies disposed in a raceway which is formed between said rings so as to enable them to rotate relative to each other, said rolling bodies being distributed uniformly in the raceway with an angular spacing λ, said bearing being provided with at least one determination system for determining the amplitude A of the pseudo-sinusoidal deformations of a zone of the stationary ring that are induced during the rotation, said bearing being characterized in that the determination system comprises:

four strain gauges, each of which delivers a signal as a function of the deformation to which said gauge is subjected, said gauges being distributed uniformly over said zone;

a measurement device for measuring four signals $V_i$, each of which is a function of the time variations of the signal emitted by a respective gauge during the rotation, said device being suitable, by combining the four signals $V_i$, for forming two signals SIN and COS of the same angle and of the same amplitude, said amplitude being a function of A; and a computation device for computing the amplitude A of the deformations zone as a function of time, said device being arranged to compute the expression $SIN^2+COS^2$ so as to deduce the amplitude A therefrom.

Other objects and advantages of the invention will appear on reading the following description given with reference to the accompanying drawings, in which.

The invention relates to a bearing comprising a fixed or "stationary" ring 1, a rotary ring, and at least one row of rolling bodies 2 disposed in a raceway 3 that is formed between said rings so as to enable said rings to rotate relative to each other.

The stationary ring 1 is designed to be associated with a fixed or "stationary" structure and the rotary ring is designed to be associated with a rotary member. In a particular application, the bearing is a motor vehicle wheel bearing, the stationary structure being the chassis of the vehicle, and the rotary member being the wheel.

Figure 1:
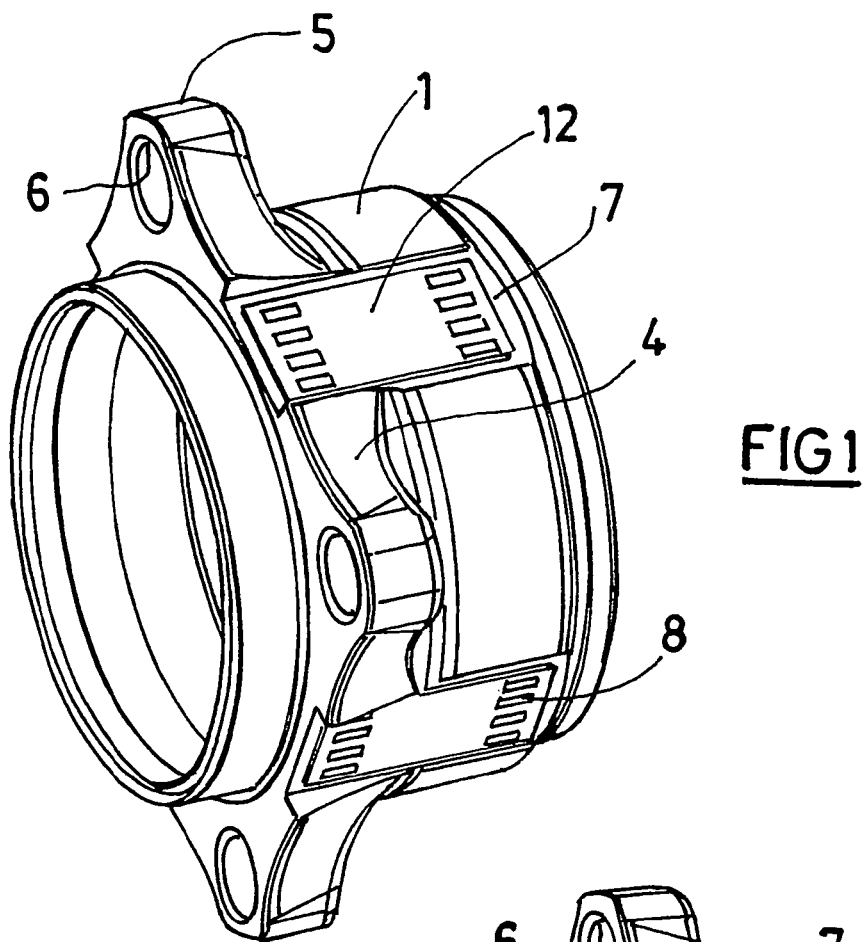
FIGS. 1 to 3 are perspective views of respective ones of three embodiments of a bearing, showing the gauges of four systems for determining the amplitudes of the pseudo-sinusoidal deformations, said gauges being disposed on respective zones of the stationary ring.
Figure 2:
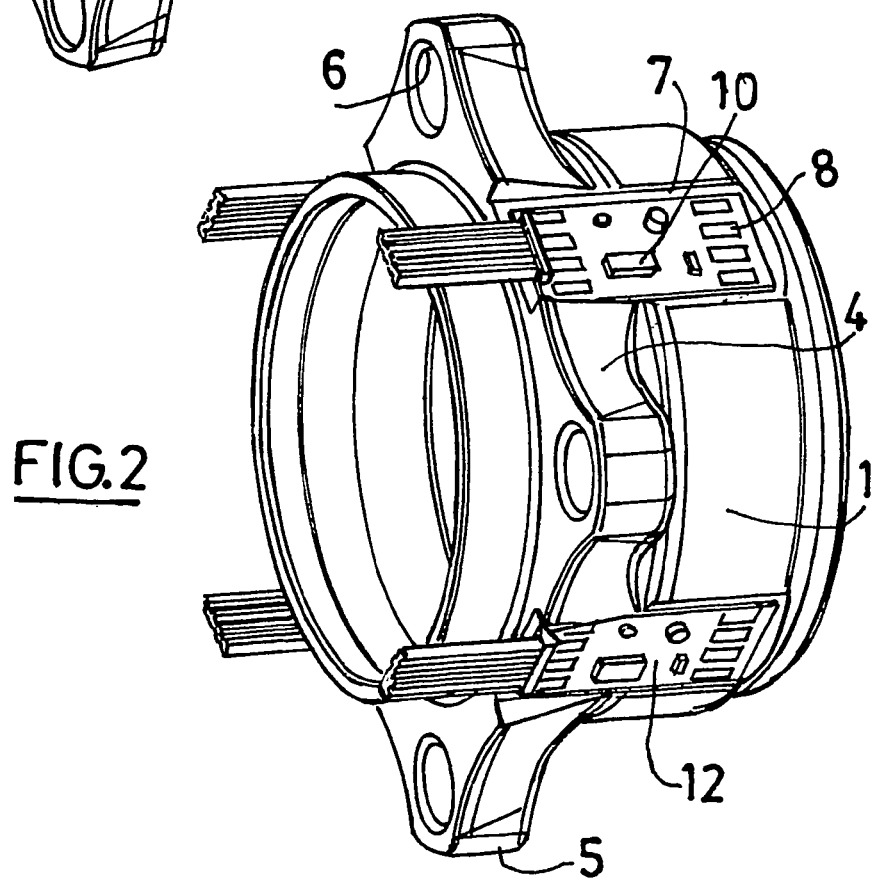
Figure 3:
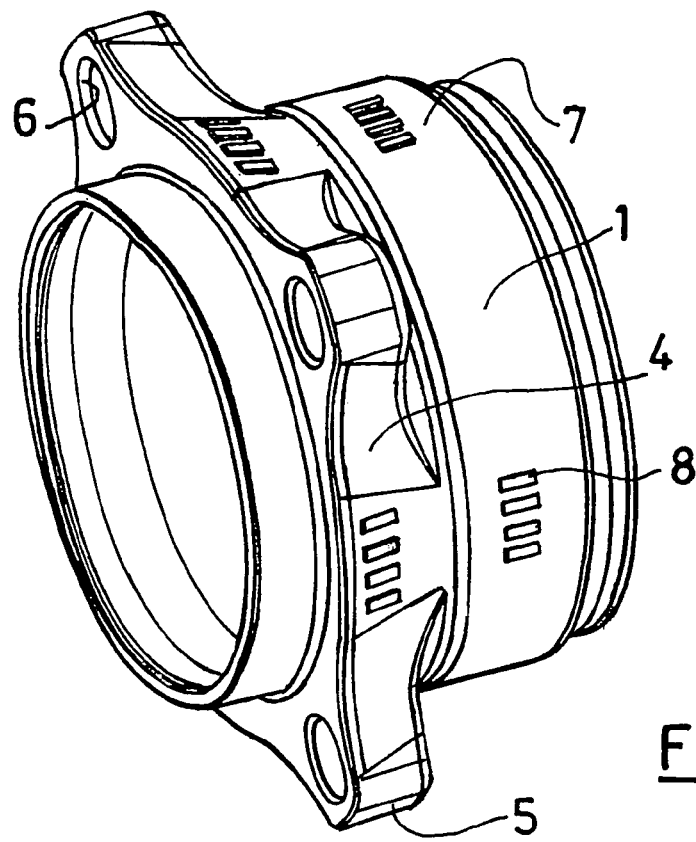

With reference to FIGS. 1 to 3, such a wheel bearing is described that comprises two rows of balls 2 that are disposed about a common axis in respective raceways 3 provided between the stationary outer ring 1 and the rotary inner ring. In addition, the stationary ring 1 is provided with fastening means for fastening to the chassis, which fastening means are formed by a flange 4 provided with four radial projections 5 in each of which an axial hole 6 is provided for enabling fastening to be achieved by means of bolting.

Figure 7:
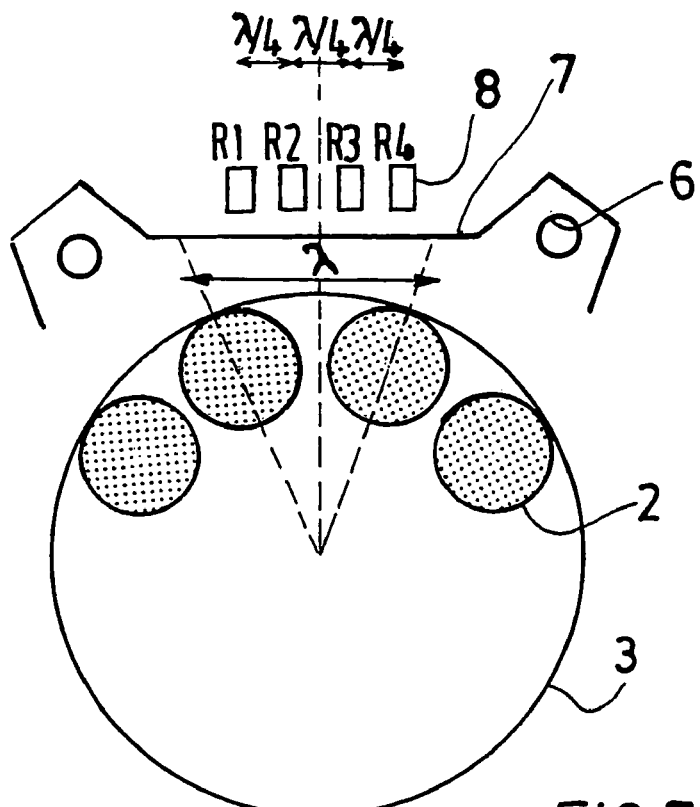
FIG. 7 is a diagrammatic view, on the stationary ring of the bearing of FIG. 1, of a particular positioning of the gauges relative to the angular spacing between the rolling bodies.
Figure 8:
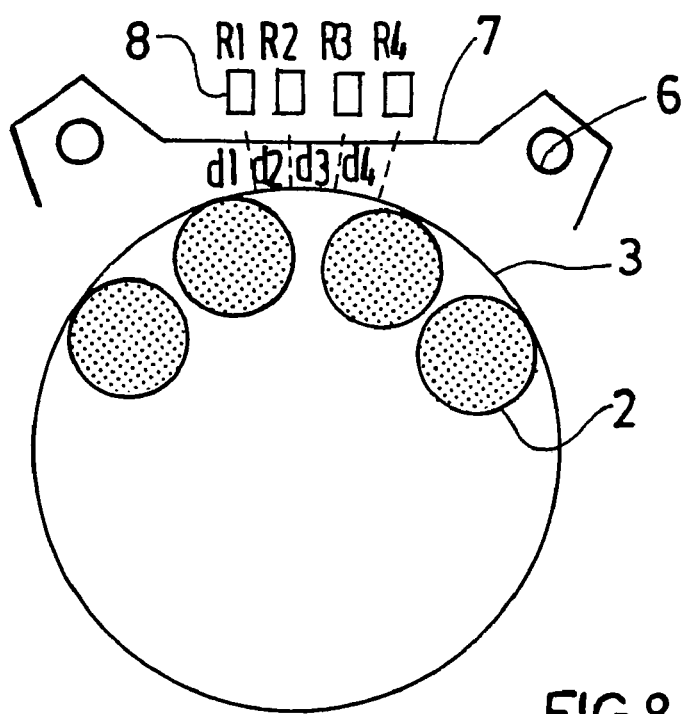
FIG. 8 is a view analogous to FIG. 7, showing the distances between the gauges and the raceway.

As shown in FIGS. 7 and 8, the balls 2 are distributed uniformly in the raceway 3 with angular spacing λ that is also referred to as the "spatial period". In a known configuration, the spacing between balls 2 is maintained by disposing them in a cage.

The invention aims to make it possible to determine the amplitude of the deformations of at least one zone 7 of the stationary ring 1 so that it is possible to deduce therefrom the forces that are applied at the interface between the wheel and the surface on which said wheel is rotating.

The balls 2 rolling along the raceway 3 induces compression and relaxation of the stationary ring 1. Thus, during rotation, the stationary ring 1 is subjected to a periodic deformation that can be approximated to a sine wave. In the description below, the term "pseudo-sinusoidal deformations" is used to designate the deformations of the stationary ring 1 during rotation.

Pseudo-sinusoidal deformation is characterized by an amplitude that depends on the loads to which the bearing is subjected and thus to the forces that are applied at the interface, and a frequency that is proportional both to the speed of rotation of the rotary ring and also to the number of balls 2.

Although the description is given with reference to a wheel bearing comprising two rows of balls 2 for which the amplitudes of the deformations are determined independently, said description is directly transposable by the person skilled in the art to some other type of bearing and/or to some other application in which it is desired to determine the amplitude of the pseudo-sinusoidal deformations of at least one zone 7 of the stationary ring 1.

In accordance with the invention, the bearing is provided with at least one system for determining the amplitude A of the pseudo-sinusoidal deformations of a zone 7 of the stationary ring 1 that are induced during the rotation, said system comprising four strain gauges 8.

Each of the gauges 8 is suitable for delivering a signal as a function of the deformation to which it is subjected. As shown in FIGS. 1 to 3, the gauges 8 are distributed uniformly over the zone 7 along a line that extends in the general direction of the rotation.

The determination system further comprises a measurement device 9 for measuring four signals $V_i$, each of which is a function of the time variations of the signal emitted by a respective one of the gauges 8 during the rotation, said device being suitable, by combining the four signals $V_i$, for forming two signals SIN and COS of the same angle and of the same amplitude, said amplitude being a function of A.

From said two signals SIN and COS, it is possible, via a computation device 10 formed, for example, by a processor, to deduce the amplitude A by computing the expression $SIN^2 + COS^2$.

Thus, since the amplitude is computed independently of the speed of rotation, it is possible to overcome, in particular, the problems of delay or of quality that are inherent to temporal determination of the deformations.

Figure 4:
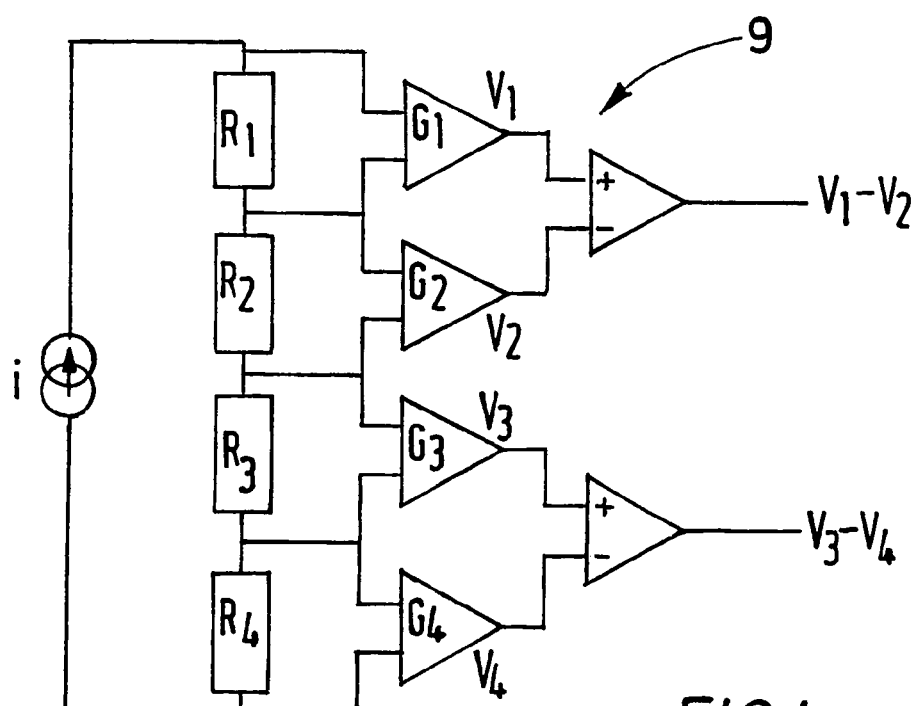
FIG. 4 is a circuit diagram of a first embodiment of a determination system of the invention.
Figure 5:
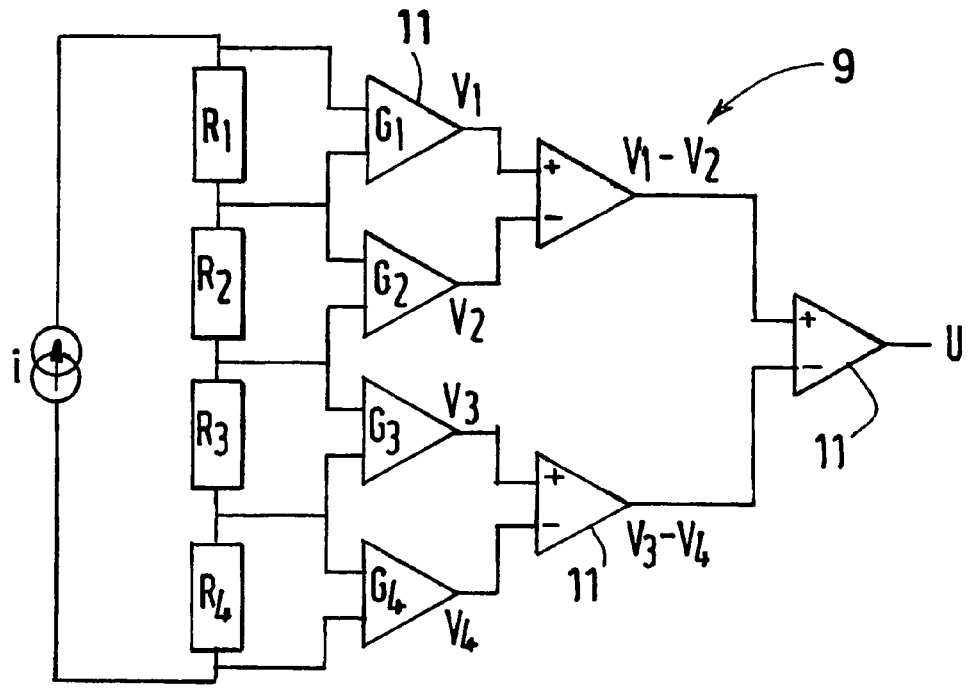
FIGS. 5 and 6 are circuit diagrams of a second embodiment of a determination system of the invention.
Figure 6:
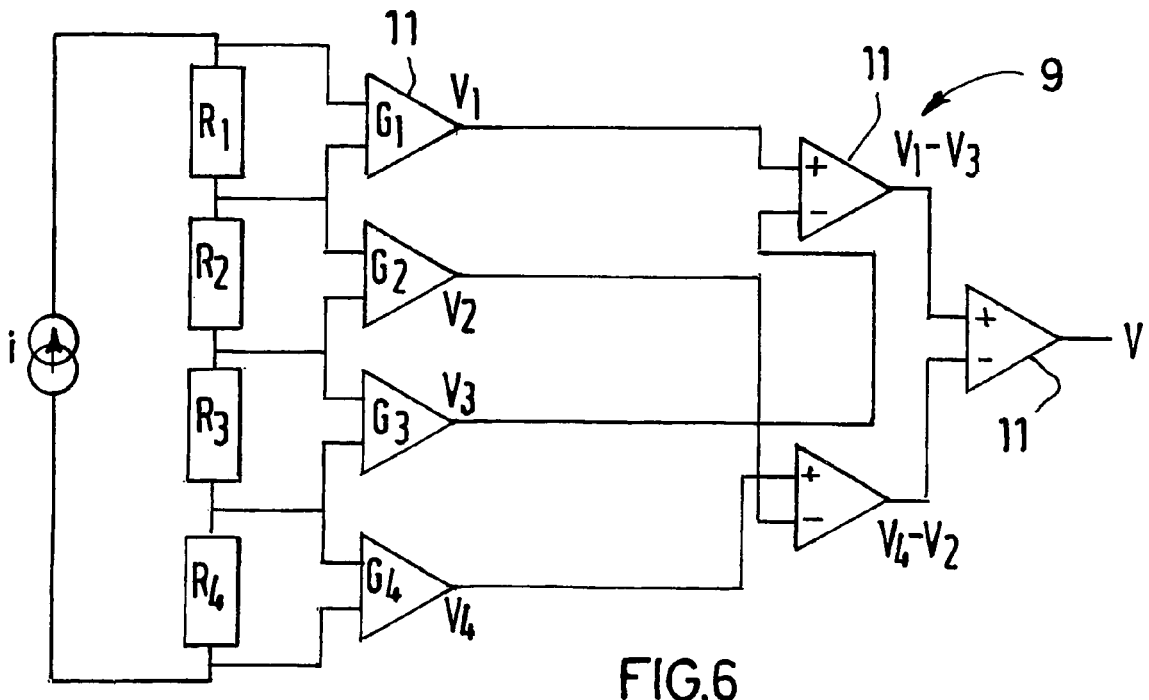

With reference to FIGS. 4 to 6, a description follows of first and second embodiments of a determination system of the invention, in which the gauges 8 are based on resistive elements, in particular piezoresistive or magnetostrictive elements, so that each of them has an electrical resistance $R_i$ that varies as a function of the deformations to which said strain 8 is subjected. In particular, each of the gauges 8 can comprise either a single resistor, or a block of a plurality of resistors that are combined to obtain an averaged resistance that is representative of the resistance at the position of the block, which means of a single resistance.

In the two embodiments shown, the measurement device 9 comprises a current loop circuit between the four gauges 8. The circuit further comprises four differential amplifiers 11 having adjustable gain $G_i$. In addition, the measurement device 9 can further comprise a signal filter stage (not shown).

The measurement device 9 thus delivers at the outputs of the amplifiers 11, the following signals:

$V_1 = G_1 \times (R_{01} + \Delta R_1 \sin(\omega t))i$ $V_2 = G_2 \times (R_{02} + \Delta R_2 \sin(\omega t + \phi))i$ $V_3 = G_3 \times (R_{03} + \Delta R_3 \sin(\omega t + 2\phi))i$ $V_4 = G_4 \times (R_{04} + \Delta R_4 \sin(\omega t + 3\phi))i$ where $R_{0i}$ are the resistances at rest of the resistors $R_i$, $\Delta R_i$ are the variations in the resistances of the gauges 8, $\omega = 2\pi/T$ (T is the time period), $\phi$ is the spatial phase shift between the gauges 8, and i is the current in the loop.

The sinusoidal nature (relative to time) of the sampled function is used to simplify the following computations, but is in no way limiting. This hypothesis assumes that the bearing is rotating at constant speed ($\omega$ constant).

In the embodiment shown in FIG. 4, the measurement device 9 further comprises a stage of differential amplifiers 11 arranged to obtain the following differences:

$$V_1 - V_2 = [(G_1 R_{01} - G_2 R_{02}) + G_1 \Delta R_1 \sin(\omega t) - G_2 \Delta R_2 \sin(\omega t + \phi)] \times i \quad (1)$$

$$V_3 - V_4 = [(G_3 R_{03} - G_4 R_{04}) + G_3 \Delta R_3 \sin(\omega t + 2\phi) - G_4 \Delta R_4 \sin(\omega t + 3\phi)] \times i \quad (2)$$

By adjusting the output gains $G_i$ so that: $G_1 = G_2 = G_3 = G_4 = G$, by setting the resistances at rest of the resistors such that: $R_{01} = R_{02} = R_{03} = R_{04}$, and, by assuming that $\Delta R_1 = \Delta R_2 = \Delta R_3 = \Delta R_4 = \Delta R$, the differences (1) and (2) become:

$$V_1 - V_2 = [G \Delta R [\sin(\omega t) - \sin(\omega t + \phi)]] \times i \quad (3)$$

$$V_3 - V_4 = [G \Delta R [\sin(\omega t + 2\phi) - \sin(\omega t + 3\phi)]] \times i \quad (4)$$

In particular, equality for the values of $\Delta R_i$ can be obtained when the gauges 8 are equidistant from the raceway.

In the particular case when $\phi = \pi/2$, i.e. when the gauges 8 are spaced apart by a distance equal to $\lambda/4$, the differences (3) and (4) can be written:

$V_1 - V_2 = [\sqrt{2} G \Delta R \cos(\omega t + \pi/4)] \times i$ $V_3 - V_4 = [\sqrt{2} G \Delta R \sin(\omega t + \pi/4)] \times i$ Therefore, in this particular case, the measurement device 9 shown in FIG. 4 makes it possible to obtain directly signals $COS = V_1 - V_2$ and $SIN = V_3 - V_4$.

Thus, by computing the expression $SIN^2 + COS^2$, it is possible to obtain:

$[\sqrt{2} G \Delta R i]^2 \times i^2$ thereby making it possible, at the output of the computation device 10, to obtain, as a function of time, the amplitude A which is a function of $\Delta R$.

With reference to FIGS. 5 and 6, a description follows of a measurement device 9 which makes it possible to obtain SIN and COS signals regardless of the value of the spatial phase shift $\phi$ between the gauges 8.

For this purpose, the measurement device 9 further comprises two stages of differential amplifiers 11, the first stage being analogous to the amplifier stage of the first embodiment of FIG. 4, and the device is thus arranged to deliver not only the signals $V_1 - V_2$ and $V_3 - V_4$ using the above-mentioned relationships (3) and (4), but also, in analogous manner, the signals $V_1 - V_3$ and $V_4 - V_2$ (FIG. 6).

The second stage comprises two differential amplifiers 11 that are shown respectively in FIG. 5 and in FIG. 6 for reasons of clarity, so as to deliver the following signals:

$U = [(V_1 - V_2) - (V_3 - V_4)]$; and $V = [(V_1 - V_3) - (V_4 - V_2)]$ i.e., on the basis of the relationships (3) and (4):

$$U = \left[ -4 G \Delta R \sin(\varphi) \times \sin\left(\frac{\varphi}{2}\right) \times \sin\left(\omega t + \frac{3\varphi}{2}\right) \right] i$$

$$V = \left[ -4 G \Delta R \sin(\varphi) \times \cos\left(\frac{\varphi}{2}\right) \times \cos\left(\omega t + \frac{3\varphi}{2}\right) \right] i$$

We thus have U=SIN and V=COS, so that, as explained above, we can obtain the amplitude A that is a function of ΔR by computing the expression $SIN^2+COS^2$ in the computation device 10.

It should be noted that, if φ is different from π/2, the amplitudes of the signals U and V are different. In order to equalize said amplitudes, it is possible to make provision for at least one differential amplifier 11 of the second stage to have adjustable gain. In particular, the gain of the amplifier 11 forming the signal U can be adjusted to:

$$\cos\left(\frac{\varphi}{2}\right)/\sin\left(\frac{\varphi}{2}\right)$$

In a variant of the embodiment shown in FIGS. 5 and 6, the second stage of the measurement device 9 includes an amplifier 11 as shown in FIG. 5 and a second amplifier 11 arranged to deliver the signal $V=2(V_2-V_3)$. Thus the signals delivered by the measurement device 9 are as follows:

$$U=[(V_1-V_2)-(V_3-V_4)]; \text{ and}$$

$$V=2(V_2-V_3)$$

This variant is particularly suitable for the case when the amplitudes of the signals $V_i$ cannot be considered to be identical, i.e. when the gauges do not detect a sine wave of the same amplitude A. Assuming a linear load distribution between the four gauges 8, the signals $V_i$ can be written:

$$V_1=(G_1R_{01}+(A+3a)\sin(\omega t))i$$

$$V_2=(G_2R_{02}+(A+a)\sin(\omega t+\varphi))i$$

$$V_3=(G_3R_{03}+(A-a)\sin(\omega t+2\varphi))i$$

$$V_4=(G_4R_{04}+(A-3a)\sin(\omega t+3\varphi))i$$

where a is the linear variation in the amplitude A to be measured.

Assuming that φ=π/2 in order to simplify the computations, although the solution in this variant is also applicable to any value of φ, the following are obtained:

$$U = \left[2\sqrt{2}\left(-A\sin\left(\omega t+\frac{3\pi}{4}\right)+a\sin\left(\omega t+\frac{\pi}{4}\right)\right)\right]i$$

$$V = \left[-2\sqrt{2}\left(A\cos\left(\omega t+\frac{3\pi}{4}\right)+a\cos\left(\omega t+\frac{\pi}{4}\right)\right)\right]i$$

We thus have U=SIN and V=COS and the square root of the expression $SIN^2+COS^2$ is equal to:

$$2\sqrt{2}A\sqrt{1+\frac{a^2}{A^2}}\times i$$

Therefore, a limited development of the first order (a<<A) gives us $2\sqrt{2}A\times i$ and thus the amplitude A which is the amplitude induced at the center of the zone in which the gauges 8 are distributed.

FIGS. 7 and 8 show gauges 8 which are spaced apart at a distance equal to λ/4, said gauges being disposed in a deformation zone that is substantially plane. As shown in FIG. 8, the gauges 8 are centered on said zone so as to be spaced apart from the raceway by respective distances $d_1, d_2, d_3, d_4$, where $d_1=d_4$ and $d_2=d_3$.

With this particular configuration of the gauges 8, the following relationship can be written:

$$\Delta R_2=k\,\Delta R_1,$$ where k>1 since $R_1$ is further away from the raceway than $R_2$ and thus the signal from the deformation of $R_1$ will be smaller than the signal from $R_2$.

And, because of the symmetry in the configuration of the gauges 8 in the deformation zone 7, we have:

$$\Delta R_3=k\,\Delta R_4=\Delta R_2=k\,\Delta R_1$$

Furthermore, the gains are adjusted so that $G_1\Delta R_1=G_2\Delta R_2=G_3\Delta R_3=G_4\Delta R_4$.

Therefore, with the preceding relationship, we have:

$$G_1=kG_2=G_4=kG_3$$

In this particular configuration, the resistances at rest of the resistors must thus be such that:

$$R_{02}=kR_{01};$$

$$R_{03}=kR_{04}; \text{ and}$$

$$R_{02}=R_{03}.$$

Therefore, in the configuration of the gauges 8 of FIGS. 7 and 8, the conditions for the gain values and for the rest resistance values of the resistors are defined so that it is possible to obtain the amplitude A.

In the general case when the gauges 8 are located on the cylindrical periphery of the outer ring 1, the gauge-to-raceway distances are all equal so that k=1. Therefore, in all cases, the gains are equal and the resistances at rest of the resistors must also be equal.

With reference to FIGS. 1 and 2, a description follows of the arrangement of the bearing as shown, in which the gauges 8 are disposed on a substrate 12 which is fastened to the deformation zone 7 of the stationary ring 1. The substrate 12 is rigidly fastened to the stationary ring 1, e.g. by adhesive bonding or by bonding of the welding type, so that the substrate also serves to transmit the deformations between the stationary ring 1 and the gauges 8.

Although the above-described gauges 8 are based on resistive elements, other gauges 8, e.g. sensors chosen from surface acoustic wave sensors and magnetic field sensors can be used in the context of the invention providing that they deliver signals that are functions of deformations. In particular, magnetic field sensors can be based on sensitive elements of the following types: magneto-resistance, giant magneto-resistance, Hall effect, tunnel-effect magneto-resistance, and magnetostrictive layers.

In the embodiment shown, the gauges 8 are screen printed in a thick layer on the substrate 12, e.g. made of a ceramic. In particular, a technology of the hybrid type makes it possible to integrate the measurement device 9 and the computation device 10 on the substrate 12 (see embodiment of FIG. 2). In addition, screen-printing makes it possible to obtain good adjustment of the resistances of the resistors and good sensitivity to deformation, while also guaranteeing precision positioning of the resistors on the substrate 12.

The deformation zone 7 is machined so that it is substantially plane and so that it extends above the two rows of balls 12. In this embodiment, the gauges 8 are not equidistant from the raceway 3 so that the amplitude of the deformation measured is a function of the gauge 8 in question (see FIGS. 7 and 8).

In the embodiment shown in FIG. 3, it is possible to make provision for the gauges 8 to be fastened directly to the curved surface of the stationary ring 1, e.g. the gauges 8 can be of the foil strain gauge type, which makes it possible, by construction, to equalize all of the distances between the gauges 8 and the raceway 3.

In the embodiment shown in FIGS. 1 and 2, the gauges of two determination systems are integrated on the same substrate 12 so that, in the vicinity of each raceway 3, at least one determination system is provided for determining the amplitude of the deformations of the zone 7.

In particular, the gauges 8 are disposed on the outside periphery of the stationary ring 1, substantially facing each of the raceways 3 so as to increase the intensity of the signals to be measured. Thus, the substrate 12 carrying the gauges 8 makes it possible to determine the amplitude of the deformations induced respectively by essentially one row of balls 2, in the same axial plane.

The bearing can be provided with at least three (eight in the embodiment shown in FIG. 1: four visible and four disposed symmetrically on the other side of the bearing) systems for determining the amplitudes of the deformations in respective zones 7 of the stationary ring, said systems being connected to or being designed to be connected to a computer suitable for computing, as a function of the determined amplitudes, the forces applied during the rotation on the stationary ring 1 and/or on an element secured to or integral with the rotary ring. In particular, such a computer is described in the Applicant's Document FR-2 839 553.

The invention claimed is:

1. A bearing assembly comprising:
   a stationary ring,
   a rotary ring,
   at least one row of rolling bodies disposed in a raceway formed between said rings enabling the rolling bodies to rotate relative to each other, wherein said rolling bodies are distributed uniformly in the raceway with an angular spacing $\lambda$ therebetween,
   at least one determination system for determining an amplitude of pseudo-sinusoidal deformations of a zone of the stationary ring that are induced during the rotation, the at least one determination system comprises:
      four strain gauges, each of which delivers a signal as a function of the deformation to which said gauge is subjected, said gauges being distributed uniformly within said zone and spaced apart at a distance equal to $\lambda/4$;
      a measurement device for measuring four signals $V_i$, each of which is a function of time variations of the signal emitted by a respective gauge during the rotation, said device being suitable, by combining the four signals $V_i$, for forming two signals SIN and COS of a same angle and of a same amplitude; and
      a computation device which computes the amplitude of the deformations of the zone as a function of time, said computation device being arranged to compute an expression $SIN^2+COS^2$ to deduce the amplitude therefrom.

2. The bearing according to claim 1, wherein the gauges comprise resistive elements wherein each of the gauges presents an electrical resistance $R_i$ that varies as a function of the deformations to which said gauge is subjected.

3. The bearing according to claim 2, wherein the measurement device comprises a current loop circuit between the four gauges, said current loop circuit including four differential amplifiers having adjustable gain $G_i$.

4. The bearing according to claim 3, wherein the measurement device further comprises one stage of differential amplifiers arranged to obtain the differences $V_1-V_2$=COS and $V_3-V_4$=SIN.

5. The bearing according to claim 3, wherein the measurement device further comprises two stages of differential amplifiers, the first stage being arranged to obtain the differences $V_1-V_2$, $V_3-V_4$, $V_1-V_3$, and $V_4-V_2$, and the second stage being arranged to obtain the differences $[(V_1-V_2)-(V_3-V_4)]$=SIN and $[(V_1-V_3)-V_4-V_2)]$=COS.

6. The bearing according to claim 3, wherein the measurement device further comprises two stages of differential amplifiers, the first stage being arranged to obtain the differences $V_1-V_2$, $V_3-V_4$, and the second stage being arranged to obtain the differences $[(V_1-V_2)-(V_3-V_4)]$=SIN and $2(V_2-V_3)$=COS.

7. The bearing according to claim 5 or claim 6, wherein at least one differential amplifier of the second stage has an adjustable gain.

8. The bearing according to any one of claims 2 to 3 and 4 to 7, wherein the gauges have resistances at rest $R_{01}$ that are mutually equal.

9. The bearing according to any one of claims 2 to 3 and 4 to 7, wherein the deformation zone is machined to be substantially plane, said gauges being centered within said zone so that, in pairs, said gauges are equidistant from the raceway, and wherein the gauges have resistances at rest $R_{01}$ such that $R_{02}=kR_{01}$, $R_{03}=kR_{04}$ and $R_{03}=R_{02}$.

10. The bearing according to claim 1, wherein the gauges are or include sensors chosen from surface acoustic wave sensors and from magnetic sensors.

11. The bearing according to any one of claims 1 to 3 and 4 to 10, wherein the gauges are disposed on a substrate that is fastened to the zone of the stationary ring.

12. The bearing according to claim 11, wherein the gauges are screen printed in a thick layer on the substrate.

13. The bearing according to claim 11 or claim 12, wherein the measurement device and the computation device are integrated on the substrate.

14. The bearing according to any one of claims 1 to 3 and 4 to 13, comprising at least three determination systems.

15. The bearing according to claim 14, wherein the at least three determination systems are connected to or are designed to be connected to a computer that is suitable, as a function of the determined amplitudes, to compute the forces applied during the rotation on the stationary ring and/or on an element secured to or integral with the rotary ring.

16. The bearing according to any one of claims 1 to 3 and 4 to 15, wherein the gauges are disposed within the zone along a line that extends in a general direction of the rotation.

17. The bearing according to any one of claims 1 to 3 and 4 to 16, the gauges are disposed in a vicinity of the raceway.

18. The bearing according to claim 17, wherein the gauges are disposed on an outer periphery of the stationary ring, substantially facing the raceway.

19. The bearing according to claim 17 or claim 18, wherein the bearing further comprises two rows of rolling bodies disposed in, respectively, one raceway (3), in which in the vicinity of each raceway, the at least one determination system is provided.

* * * * *